Jan. 8, 1957 J. F. WOOD 2,777,016

DUAL NEEDLE PHONOGRAPH CARTRIDGE

Filed Dec. 19, 1952

INVENTOR.
John F. Wood

By Alois W. Graf
Attorney 2,777,016
Patented Jan. 8, 1957

2,777,016

DUAL NEEDLE PHONOGRAPH CARTRIDGE

John F. Wood, Buchanan, Mich., assignor to Electro-Voice, Incorporated, Buchanan, Mich.

Application December 19, 1952, Serial No. 326,934
5 Claims. (Cl. 179—100.41)

The present invention relates to a dual needle phonograph cartridge of an improved type having different compliance in accordance with the record to be reproduced.

Two types of phonograph records are now in common use, one being the older 78 R. P. M. type with a groove requiring a three mil phonograph needle, the other being one which requires a one mil phonograph needle. The latter type of record has grooves which are spaced much closer and are much shallower than the older record, and hence the excursion of the needles in the grooves is appreciably less than in the older phonograph record. For convenience in playing either of the records it is desirable to have a single phonograph cartridge provided with dual needles.

In dual needle phonograph cartridges, particularly of the turnover type, there are several factors which must be considered in order to obtain optimum performance. It is desirable that the output of the cartridge remain within certain limits irrespective of the type of record being reproduced. Where a single strain responsive or piezoelectric element is driven by two different needles, it is desirable to decouple one needle from the other, and to provide for the selective damping of one needle without appreciably affecting the sensitivity or response of the other needle. It furthermore is necessary to have the needles so located that when the cartridge is turned over they are in alignment within a relatively small tolerance.

It, therefore, is in object of the present invention to provide an improved phonograph cartridge which balances the outputs in accordance with the different types of phonograph record being reproduced.

Another object of the invention is to provide an improved phonograph cartridge construction wherein one needle is decoupled from the other needle.

Another object of the invention is to provide in a phonograph cartridge an arrangement for selectively damping one needle without appreciably affecting the sensitivity or response of the other needle.

A still further object of the invention is to reduce in a phonograph cartridge the effective mass of one needle assembly upon the other needle.

Still another object of the invention is to provide in a phonograph cartridge an arrangement whereby a different compliance is obtained for the different needles.

Still another object of the invention is to provide an improved means for centering the needles of a phonograph cartridge.

Other and further objects of the invention subsequently will become apparent by reference to the following description taken in conjunction with the accompanying drawing wherein.

Figures 1, 2, 3, 4, 5, 6:
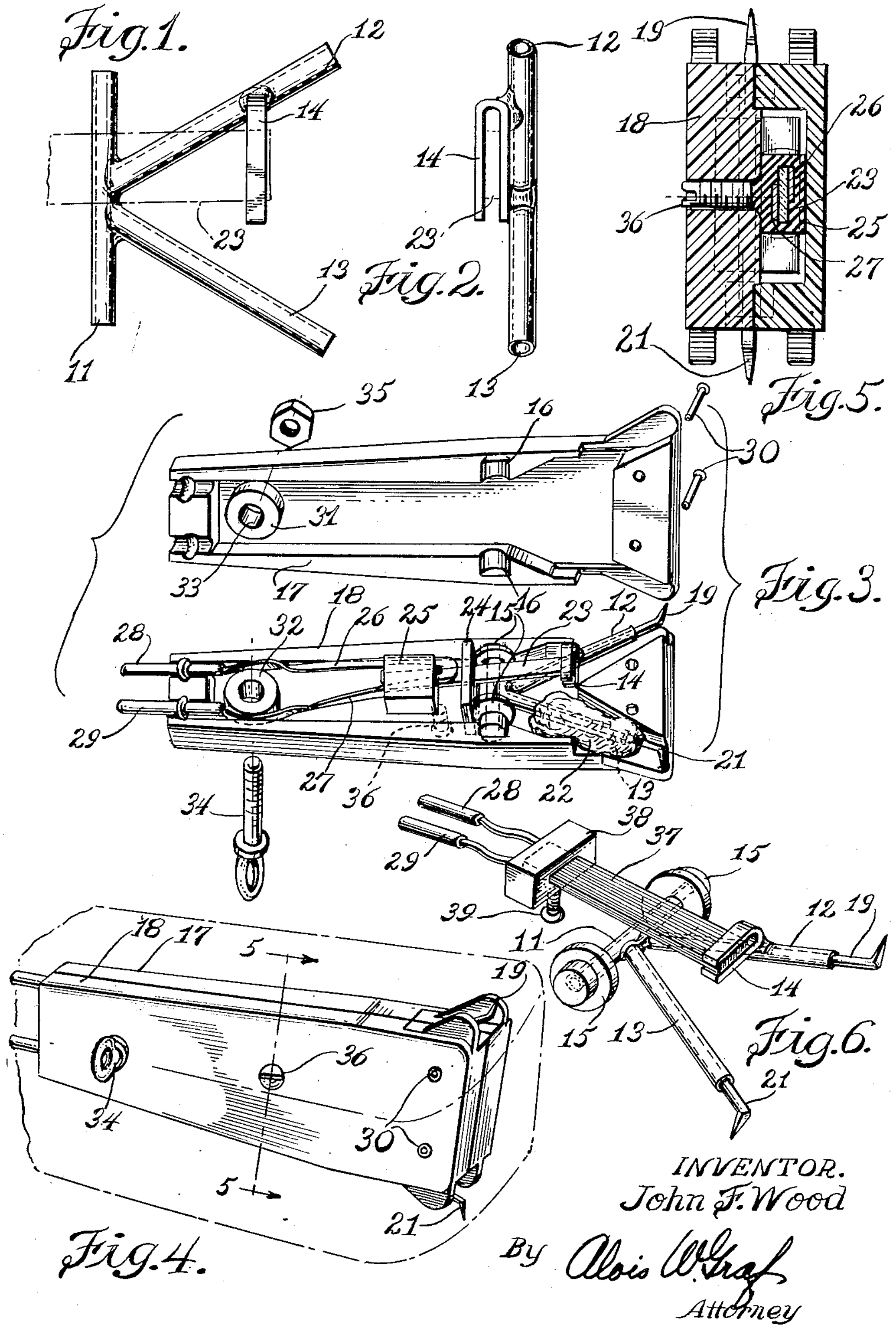
Figure 1 is a side view of a drive mechanism and needle chuck for a phonograph cartridge.
Figure 2 is an end view of the drive mechanism and needle chuck shown in Figure 1.
Figure 3 is an exploded view of a phonograph cartridge illustrating the assembly of components thereof.
Figure 4 is a perspective view of the assembled phonograph cartridge shown in Figure 3.
Figure 5 is a cross-sectional view through the assembled phonograph cartridge of Figure 4 as seen in the direction of the arrows along the line 5—5.
Figure 6 is a perspective view of the internal elements of a phonograph cartridge where the piezoelectric element is of the crystal variety.

Figures 1 and 2 show a drive mechanism for the strain sensitive or piezoelectric element of a phonograph pickup cartridge. This comprises a rotatable shaft or rod 11 which is to be suitably journalled in bearing members in the phonograph cartridge housing. Two needle chucks 12 and 13 arranged in a common plane have their ends connected at an intermediate point on the rotatable member 11. The one needle chuck 12 at an intermediate point carries a member 14, which in the present embodiment has a U-shape for engaging one edge or end of a piezoelectric element.

The drive mechanism shown in Figures 1 and 2 is provided with suitable bearing members 15 shown in Figure 3 each comprising a sleeve ending in a collar. The bearing sleeves 15 are mounted in suitable complementary recesses 16 formed in the two halves 17 and 18 of the phonograph cartridge casing. It will be noted that the chuck 12 has been provided with a one mil needle 19 and the chuck 13 with a three mil needle 21. In order to provide a selective degree of damping for the chuck 13 and the needle 21 a portion of the chuck 13 is surrounded by a viscous material 22 which may be a grease or similar product. The U-shaped clamp 14 engages one end of a ceramic piezoelectric element which at an intermediate point is engaged by a damping pad 24. The other end of the strain responsive element 23 is surrounded by a mounting block 25 of resilient material which is under a certain degree of compression when the two halves 17 and 18 of the casing are connected together. Opposite surfaces of the piezoelectric element 23 are engaged by conductive strips 26 and 27 which extend to the electrical terminals or prongs 28 and 29 passing through the rear end of the casing.

It will be noted that the casing is provided with bosses 31 and 32 having an aperture 33 through which is passed a bolt 34 secured in position by a nut 35 to hold the casing members 17 and 18 together. The nut 35 and bolt 34 could be replaced by a rivet. The two rivets 30 may be used to hold together the forward portions of the casing.

The casing portion 18 adjacent one edge of the block 25 is provided with a threaded aperture in which is fitted a set screw 36. The purpose of this arrangement will be better understood by reference to Figure 5, from which it will be noted that the mounting block 25 normally being under some degree of compression tends to enter into the recess or aperture which holds the screw 36. By adjusting the screw 36 the material of the block 25 which is in engagement with the end of the set screw 36 may be moved inwardly into the casing thereby to produce a change in the position of the piezoelectric element 23. This is brought about by an angular deflection of mounting block 25. The change in the position of the element 23 produces a change in the position of the chucks 12 and 13 thereby to align these chucks so that the needles 19 and 21 will rest substantially in the same place irrespective as to whether the needle 19 is in use or the needle 21 is in use.

The drive mechanism illustrated in Figures 1 and 2 is also applicable to a piezoelectric element such as a Rochelle salt crystal 37 shown in Figure 6. One end of the piezoelectric element 37 is supported in a mounting block 38 similar to the block 25 of Figure 3. This block likewise is to be adjusted by a set screw 39. Other elements of the assembly which correspond to those in Figure 3 bear similar reference characters.

It will be noted that the needle 19 is coupled to the piezoelectric element 23 directly through the chuck 12 and the clamp 14. The other needle 21, however, is coupled to the piezoelectric element 23 through the compliance of the chuck 13, the torsional compliance of the pivoted member 11 and the compliance of the chuck 12. This provides a decoupling of the needle 21 from the needle 19. The decoupled needle, therefore, can be driven at a higher amplitude of excursion, whereas the closely coupled needle 19 produces proper output for the lower level or microgroove recordings. Since the needles are decoupled they can be made to have different response characteristics. The needle 19 may have a wider frequency range response while the needle 21 may have a roll-off in frequency response to reduce the noise level associated with the older shellac records. In a representative model the needle 19 had a response up to 7000 C. P. S. whereas the needle 21 had a response only up to about 2500 C. P. S. This decoupling arrangement also provides for the selective damping of the chuck 13 by the viscous mass 22 without appreciably affecting the sensitivity or response of the needle 19. It thus will be appreciated that the present arrangement provides an isolating compliance between the needle 21 and the piezoelectric element 23.

While for the purpose of illustrating and describing the present invention a particular embodiment has been shown in the drawing, it is to be understood that such variations are contemplated as may be commensurate with the spirit and scope of the invention set forth in the accompanying claims.

I claim as my invention:

1. A phonograph cartridge comprising a casing, a strain responsive element mounted in said casing, and a driving mechanism for said element having a pivoted member arranged transversely of the longitudinal axis of said casing, a pair of needle chucks in a common plane, each arranged at an angle to said pivoted member and having one end connected thereto, and a member connected to an intermediate part of one of said chucks and secured to one end of said strain responsive element.

2. A phonograph cartridge having a casing, a piezoelectric element, a resilient support block surrounding one end of said element, said block being under compression in said casing, an aperture in one side of said casing adjacent one edge of said support block, and a set screw for said aperture for adjustably engaging said block thereby to change the position of said element in said casing.

3. A phonograph cartridge having a casing provided with an aperture transverse to the longitudinal axis of said casing, a piezoelectric element, a resilient support pad surrounding the end of said element and being located within said casing under compression to cover said aperture, an actuating mechanism pivotally mounted in said casing in engagement with the other end of said element, and a set screw mounted in said aperture for selective engagement with said pad to adjust the position of said mechanism.

4. A phonograph cartridge having a casing , a piezoelectric element, a resilient support block surrounding the end of said element and being located within said casing under compression, an aperture in said casing adjacent the lateral edge of said block, an actuating mechanism mounted in said casing in engagement with the other end of said element, and adjustable means mounted in said aperture for selective engagement with said block to adjust the position of said actuating mechanism.

5. A phonograph cartridge having a casing, a piezoelectric element, a resilient support block surrounding said element and being located within said casing under compression, an aperture in said casing adjacent the lateral edge of said block, an actuating mechanism mounted in said casing in engagement with the other end of said element, said mechanism having a needle chuck, and a set screw mounted in said aperture for selective engagement with said block to adjust the position of said chuck.

References Cited in the file of this patent

UNITED STATES PATENTS

| | | |
|---|---|---|
| 2,484,950 | Jaffe | Oct. 18, 1949 |
| 2,580,694 | Munroe | Jan. 1, 1952 |
| 2,601,126 | Palo et al. | June 17, 1952 |
| 2,668,196 | Bauer | Feb. 3, 1954 |